United States Patent
Jiang et al.

(10) Patent No.: US 9,059,799 B2
(45) Date of Patent: Jun. 16, 2015

(54) APPARATUS AND METHOD TO CALCULATE A NOISE FIGURE OF AN OPTICAL AMPLIFIER FOR WAVELENGTH CHANNELS IN A PARTIAL-FILL SCENARIO TO ACCOUNT FOR CHANNEL LOADING

(75) Inventors: Zhiping Jiang, Kanata (CA); Jian Zhong, Kanata (CA); Yan Cui, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 440 days.

(21) Appl. No.: 13/091,690

(22) Filed: Apr. 21, 2011

(65) Prior Publication Data

US 2012/0269519 A1  Oct. 25, 2012

(51) Int. Cl.
 *H04B 10/00* (2013.01)
 *G02F 2/00* (2006.01)
 *H04B 10/079* (2013.01)

(52) U.S. Cl.
 CPC .................. *H04B 10/0797* (2013.01)

(58) Field of Classification Search
 CPC ..... H03F 3/082; H04B 10/07; H04B 10/0797
 USPC .......... 398/25, 159; 359/341.41, 337.12, 291, 359/333.12, 337.22, 337.4, 510
 See application file for complete search history.

(56) References Cited

U.S. PATENT DOCUMENTS

| | | | | |
|---|---|---|---|---|
| 5,471,334 A | * | 11/1995 | Masuda et al. | 359/337 |
| 5,521,751 A | * | 5/1996 | Aida et al. | 359/337 |
| 5,677,781 A | * | 10/1997 | Mori et al. | 398/26 |
| 5,894,362 A | * | 4/1999 | Onaka et al. | 398/95 |
| 6,008,935 A | * | 12/1999 | Fujita et al. | 359/341.4 |
| 6,084,233 A | * | 7/2000 | Hodgson et al. | 250/227.14 |
| 6,134,047 A | * | 10/2000 | Flood et al. | 359/337.12 |
| 6,212,003 B1 | * | 4/2001 | Komazawa et al. | 359/341.1 |
| 6,365,891 B1 | * | 4/2002 | Hodgson et al. | 250/227.14 |
| 6,381,560 B1 | * | 4/2002 | Shah et al. | 703/2 |
| 6,480,318 B2 | * | 11/2002 | Mori et al. | 359/264 |
| 6,545,799 B1 | * | 4/2003 | McNamara et al. | 359/337.11 |
| 6,599,039 B1 | * | 7/2003 | Nakazato | 398/25 |
| 6,639,716 B1 | * | 10/2003 | Tomofuji | 359/337.12 |
| 6,836,587 B2 | * | 12/2004 | Kosaka et al. | 385/24 |
| 6,885,499 B1 | * | 4/2005 | Hoshida et al. | 359/337 |
| 7,212,335 B2 | * | 5/2007 | Nishihara | 359/341.42 |

(Continued)

FOREIGN PATENT DOCUMENTS

EP  1788730 A1  11/2005

OTHER PUBLICATIONS

Foreign Communication From a Related Counterpart Application, PCT Application PCT/CN2012/074541, International Search Report dated Aug. 2, 2012, 5 pages.

(Continued)

*Primary Examiner* — Ken Vanderpuye
*Assistant Examiner* — Abbas H Alagheband
(74) *Attorney, Agent, or Firm* — Conley Rose, P.C.; Grant Rodolph; Jonathan K. Polk

(57) ABSTRACT

An apparatus comprising a processor configured to calculate a noise figure of an optical amplifier for a plurality of selected wavelength channels in a partial-fill scenario that accounts for channel loading. The noise figure is calculated using a plurality of corresponding noise figure correction values at a plurality of wavelengths based on an effective number of channels.

22 Claims, 15 Drawing Sheets

(56) References Cited

U.S. PATENT DOCUMENTS

| | | | |
|---|---|---|---|
| 7,236,294 B2* | 6/2007 | Takeyama et al. | 359/337 |
| 7,688,498 B2 | 3/2010 | Onaka et al. | |
| 8,358,930 B2* | 1/2013 | Gariepy et al. | 398/26 |
| 8,364,034 B2* | 1/2013 | He et al. | 398/25 |
| 2001/0046082 A1* | 11/2001 | Mori et al. | 359/333 |
| 2002/0041431 A1* | 4/2002 | Ohshima et al. | 359/334 |
| 2002/0089665 A1* | 7/2002 | Ishihara et al. | 356/307 |
| 2002/0126345 A1* | 9/2002 | Green et al. | 359/122 |
| 2002/0159135 A1* | 10/2002 | Kelkar et al. | 359/337.1 |
| 2002/0186454 A1* | 12/2002 | Sakurai | 359/333 |
| 2003/0174390 A1* | 9/2003 | Kakui | 359/341.3 |
| 2005/0094254 A1* | 5/2005 | Mongardien et al. | 359/337.4 |
| 2005/0123295 A1* | 6/2005 | Hullin et al. | 398/25 |
| 2005/0146782 A1* | 7/2005 | Takeyama et al. | 359/337.1 |
| 2005/0180757 A1* | 8/2005 | Nissov et al. | 398/147 |
| 2006/0024063 A1* | 2/2006 | Onaka et al. | 398/149 |
| 2006/0028712 A1* | 2/2006 | Ohtsuki et al. | 359/337 |
| 2006/0072188 A1* | 4/2006 | Al-Salameh et al. | 359/337 |
| 2006/0109543 A1* | 5/2006 | Bragheri et al. | 359/334 |
| 2006/0126158 A1* | 6/2006 | Fella et al. | 359/334 |
| 2007/0115538 A1* | 5/2007 | Charlet et al. | 359/334 |
| 2008/0068701 A1* | 3/2008 | Wysocki et al. | 359/341.1 |
| 2009/0214204 A1* | 8/2009 | Bengtsson et al. | 398/38 |
| 2009/0319572 A1* | 12/2009 | Bernard | 707/104.1 |

OTHER PUBLICATIONS

Foreign Communication From a Related Counterpart Application, PCT Application PCT/CN2012/074541, Written Opinion dated Aug. 2, 2012, 9 pages.

* cited by examiner

APPARATUS AND METHOD TO CALCULATE A NOISE FIGURE OF AN OPTICAL AMPLIFIER FOR WAVELENGTH CHANNELS IN A PARTIAL-FILL SCENARIO TO ACCOUNT FOR CHANNEL LOADING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical transmission systems constitute the basic carrier for most telecommunication systems. Many optical transmission technologies are based on the principle of wavelength division multiplexing (WDM) or Dense WDM (DWDM), where the transmission channels are carried by optical signals over different wavelengths or different bands of wavelengths. The optical signals are initially modulated at the transmitter end of the optical network, propagated through the network via an optical link or fiber, and then detected at the receiver end. The optical signal may also be amplified before or after transmission to enhance performance, for example to compensate for attenuation or noise during transport. Erbium Doped Fiber Amplifiers (EDFAs) are one type of optical amplifiers that are commonly used in optical systems. However, EDFAs may also contribute noise in the optical signals, which needs to be accounted for.

SUMMARY

In one embodiment, the disclosure includes an apparatus. The apparatus includes a processor configured to calculate a noise figure of an optical amplifier for a plurality of selected wavelength channels in a partial-fill scenario that accounts for channel loading. The noise figure is calculated using a plurality of corresponding noise figure correction values at a plurality of wavelengths based on an effective number of channels.

In another embodiment, the disclosure includes a network component. The network component includes a processor configured to calculate a gain correction for a gain caused by an optical amplifier for a plurality of selected wavelength channels in a partial-fill scenario that accounts for channel loading. The gain correction is based on a spectral hole burning effect model that is calculated for a range of wavelengths based on a number of the selected wavelength channels.

In a third aspect, the disclosure includes a method. The method includes calculating an effective number of channels for a plurality of wavelengths. The method also includes calculating a noise figure correction for the wavelengths based on the effective number of channels. The method further includes adjusting a noise figure that corresponds to an optical amplifier using the noise figure correction.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

EDFAs may be deployed in optical communications systems, such as in various locations on the optical links. Understanding and modeling of EDFAs' performance and characteristics, such as noise and gain characteristics, may be critical to improve the optical communications systems' network design and control. The EDFA's characteristics may comprise the EDFA's noise figure, which may be used to calculate the optical links or the system's optical signal to noise ratio (OSNR). The EDFA's characteristics may also comprise the EDFA's gain, which may be used to calculate the OSNR, the power ripple, and/or dynamic range requirement of a channel actuator for OSNR equalization.

The noise figure may be a function of the EDFA's operating conditions, which may be based on wavelength, gain, input power, gain tilt, and/or channel loading. Typically, the noise figure's dependence on wavelength, gain, input power, and/or gain tilt may be modeled under a full-fill condition, which may not include the noise figure's dependence on channel loading. Channel loading may correspond to the specific set of wavelength channels used or selected to transmit signals. A typically derived and used multi-dimensional noise figure model may be valid for the full-fill condition but ignore channel loading, and thus may not be sufficiently accurate to reflect the actual noise in the system. The gain may also be modeled under the full-fill condition. However, due to spectral hole burning (SHB) effects, the gain may also substantially depend on channel loading. For instance, the gain change caused by SHB may exceed the full-fill peak-to-peak gain ripple specification. Thus, the full-fill gain model may also include errors with respect to the actual gain in the system.

Due to such shortfalls of the full-fill noise figure and gain models, implementing such models for real case scenarios, such as partial-fill scenarios using channel loading, may lead to substantial errors in link budget and system control. Thus, it may be useful to derive models that also apply to the partial-fill scenarios. Disclosed herein is a method for deriving and/or using phenomenological models to describe the noise figure and gain that account for channel loading that may be applied in partial-fill scenarios.

Figure 1:
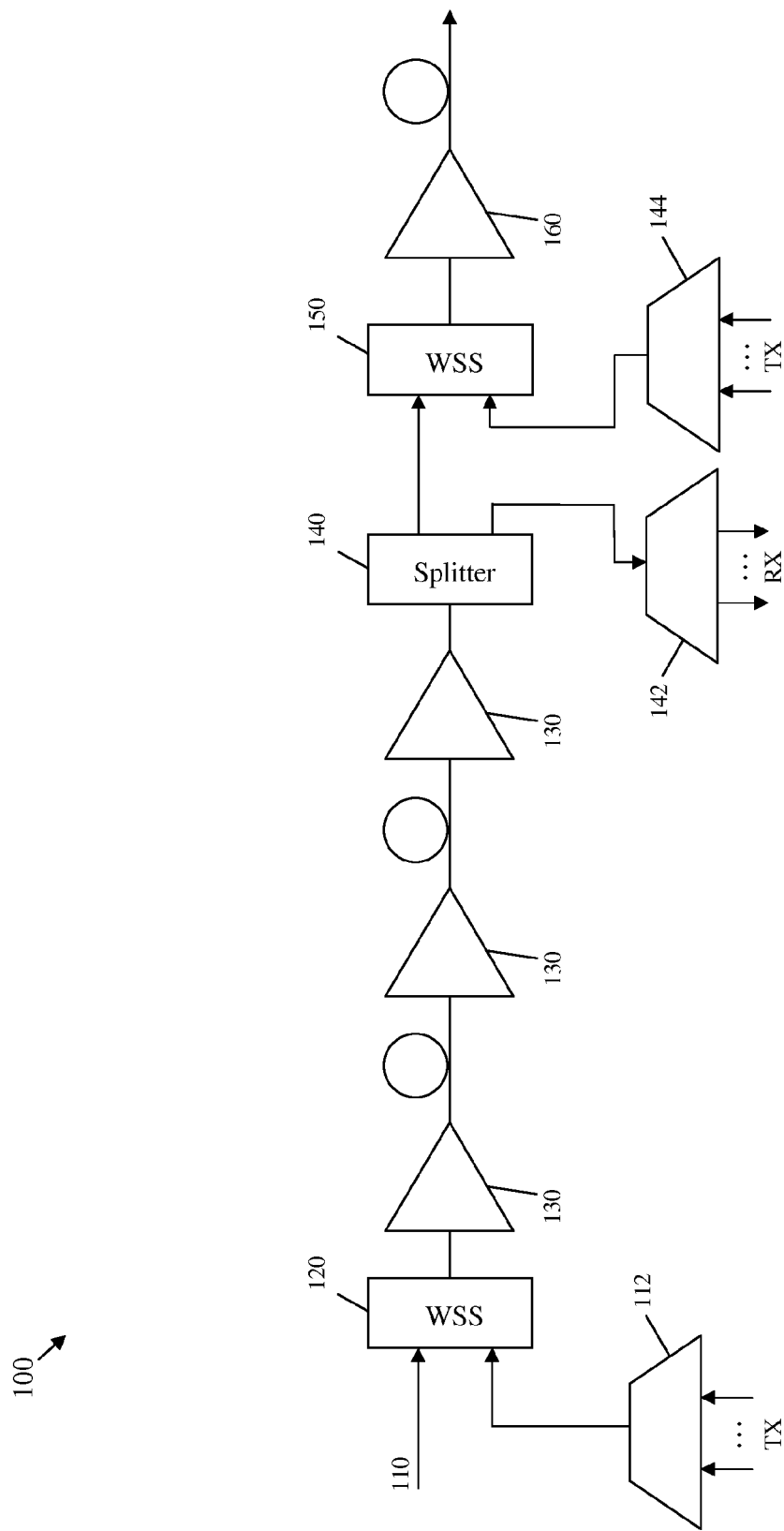
FIG. 1 is a schematic diagram of an embodiment of an optical communications system.

FIG. 1 illustrates an embodiment of an optical communications system 100 that may use EDFAs to boost optical signals on optical links. For instance, the optical communications system 100 may be a WDM or DWDM system and may be a part of a wavelength switched optical network (WSON) or a passive optical network (PON). The optical communications system 100 may comprise an express channel source/input 110, a first multiplexer 112, a first wavelength selective switch (WSS) 120, one or more first EDFAs 130, a splitter 140, a demultiplexer 142, a second multiplexer 144, a second WSS 150, and a second EDFA 160. The components of the optical communications system 100 may be arranged as shown in FIG. 1.

The express channel source/input 110, first multiplexer 112, and first WSS 120 may be located at a first provider site, where the first multiplexer 112 may be coupled to one or more transmitters (TX) (not shown). The first EDFAs 130 may be coupled to an optical link that extends from the first WSS 120 to the splitter 140. The splitter 140, demultiplexer 142, and second multiplexer 144 may be located at a customer or distribution site, where the demultiplexer 142 may be coupled to one or more receivers (RX) (not shown). The second WSS 150 and second multiplexer 144 may be coupled to one or more transmitters (TX), for instance at the same customer or distribution site or at a second provider site that is coupled to the customer or distribution site. The second EDFA 160 may be coupled to a second optical link that extends from the second WSS 150, e.g., to a second customer or distribution site (not shown).

The express channel source/input 110 may be a data channel and/or a carrier for data channels. The first multiplexer 112 may be any device or component configured to combine a plurality of different wavelength channels from one or more transmitters into a single combined channel and redirect the single combined channel to the first WSS 120. The different wavelength channels may be data channels that may be transmitted from one or a plurality of transmitters coupled to the first multiplexer 112. The first WSS 120 may be any device or component configured to combine the single combined channel from the first multiplexer 112 and the express channel 110 into a signal, and transmit the signal on the optical link that is coupled to the first WSS 120. The first EDFAs 130 may be configured to boost or amplify the combined signal from the first WSS 120 that is transmitted on the optical link.

The splitter 140 may be any device or component configured to split the received combined signal on the optical link into the single combined channel and the express channel 110 and redirect the single combined channel to the demultiplexer 142 and the express channel to the second WSS 150. The demultiplexer 142 may be any device or component configured to split the single combined channel into the different wavelength channels and redirect the wavelength channels to one or more receivers.

The second WSS 150 may be configured similar to the first WSS 120. The second WSS 150 may combine the express channel 110 from the splitter 140 and a single combined channel from the second multiplexer 144 into a combined signal, and transmit the combined signal on the second optical link that is coupled to the second WSS 150. The second multiplexer 144 may be configured similar to the first multiplexer 112. The second multiplexer 144 may combine a plurality of different wavelength channels from one or more transmitters into the single combined channel and redirect the single combined channel to the second WSS 150. The second EDFAs 160 may be configured similar to the first EDFAs 130. The second EDFAs 160 may boost or amplify the combined signal from the second WSS 150 that is transmitted on the second optical link.

Typically, the optical communications system 100 or at least some of its components may be designed and/or controlled based on the noise and gain characteristics of the first EDFAs 130 and the second EDFA 160 based on full-fill conditions models, e.g., without accounting to channel loading and/or SHB effects. For instance the component of the optical communications system 100 may be designed and/or controlled according to a full-fill noise figure model, a full-fill gain ripple model, or both.

Figure 2:
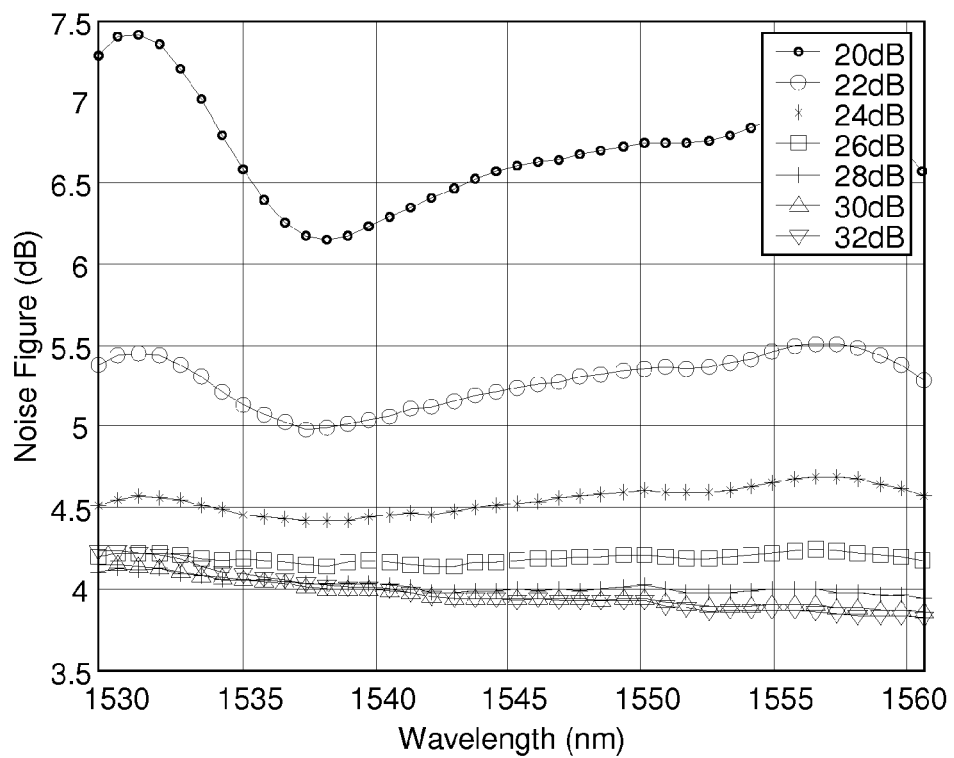
FIG. 2 is a chart of an embodiment of a full-fill noise figure.

FIG. 2 illustrates one embodiment of a full-fill noise figure 200 for an EDFA, such as the first EDFAs 130 and/or the second EDFA 160. FIG. 2 shows a plurality of curves for a plurality of different EDFA gains that range from about 20 decibel (dB) to about 32 dB (as indicated in the legend). Each curve represents a full-fill noise figure (in dB) as a function of wavelengths that extend from about 1,530 nanometers (nm) to about 1560 nm. The gain tilt and per channel output power for all curves is about the same. The curves indicate that the noise figure may be sensitive to wavelength and gain at the lower gain values (e.g., closer to about 20 dB). At the higher gain values (e.g., closer to about 32 dB), the noise figure is relatively constant and may not be sensitive to wavelength and/or gain.

Figure 3:
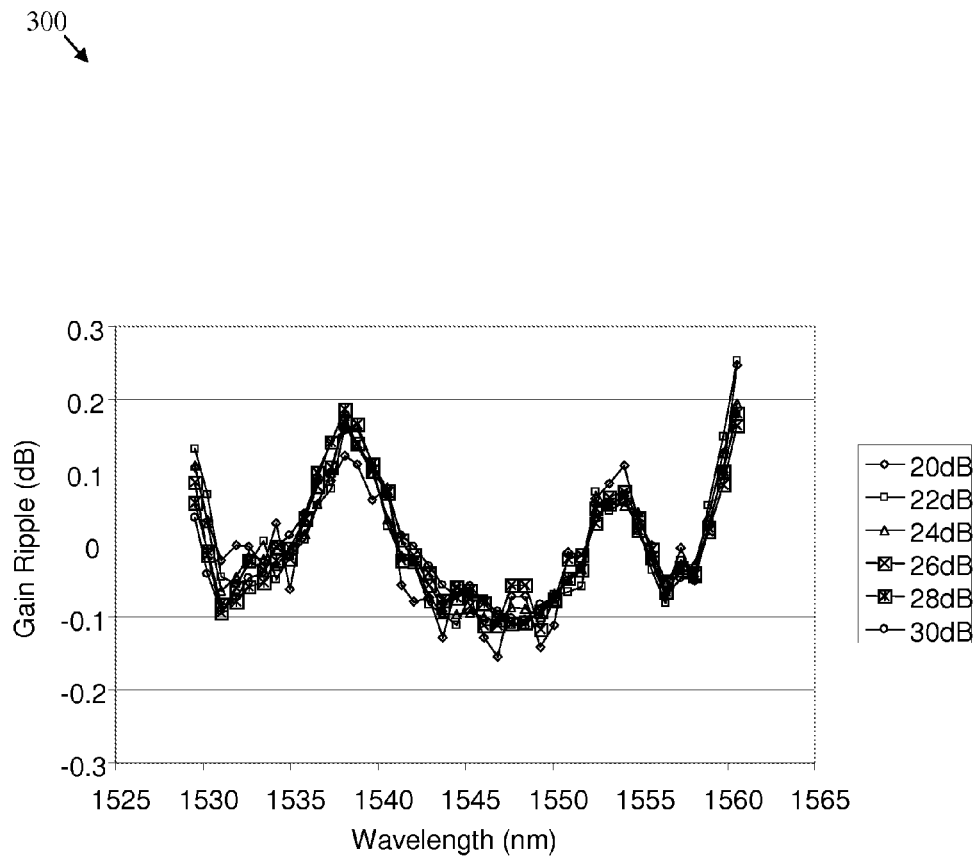
FIG. 3 is a chart of an embodiment of a full-fill gain ripple.

FIG. 3 illustrates one embodiment of a full-fill gain ripple 300 for an EDFA, such as the first EDFAs 130 and/or the second EDFA 160. FIG. 3 shows a plurality of curves for the same gains in FIG. 2 (e.g., ranging from about 20 dB to about 30 dB). Each curve represents a signal gain ripple or variation (in dB) in the full-fill condition as a function of wavelength, which extends from about 1,525 nm to about 1565 nm. The gain ripple curves correspond to the first six noise figure curves in FIG. 2 and are obtained under similar conditions. The gain ripple curves indicate that the gain is relatively constant and may not be sensitive to wavelength and/or gain over substantially the entire gain range from about 20 dB to about 30 dB. Specifically, in some embodiment, the variations in the gain values for the different gains range from about −0.1 dB to about 0.2 dB, which may be substantially small. In other embodiments, the variations in the gain values for the different gains may be larger.

Figure 4:
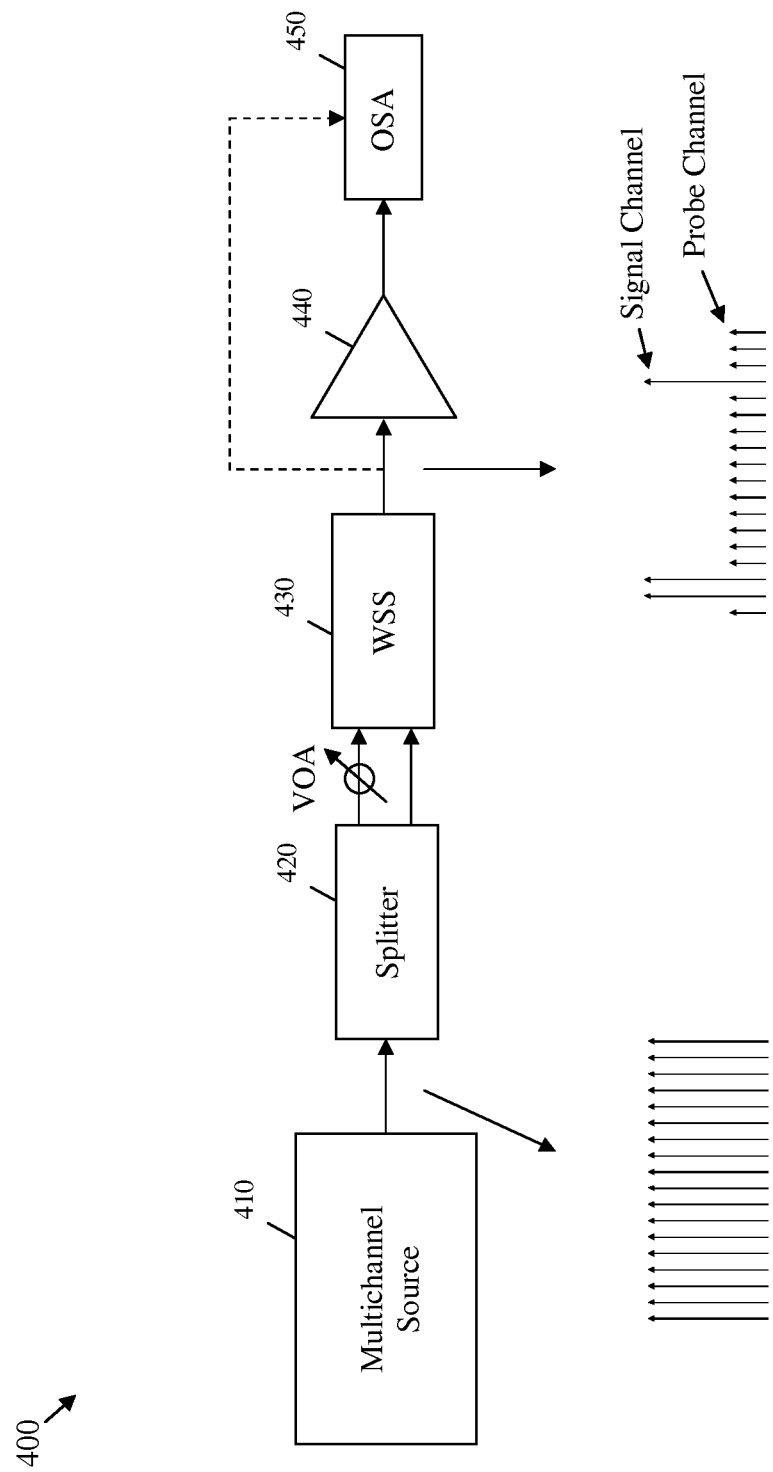
FIG. 4 is a schematic diagram of an embodiment of a measurement apparatus.

FIG. 4 illustrates an embodiment of a measurement apparatus 400. The measurement apparatus 400 may be used to measure the noise figure and gain ripple of an EDFA in the partial-fill condition, which may include channel loading effects. The measurement apparatus 400 may comprise a multichannel source 410, a splitter 420, a WSS 430, an EDFA 440, and an optical spectrum analyzer (OSA) 450, which may be arranged as shown in FIG. 4.

The multichannel source 410 may be configured to transmit a plurality of wavelength channels, e.g., optical signals, that extend a range of wavelengths, e.g., from about 1,530 nm to about 1,560 nm. The splitter 420 may be configured to split the power of the wavelength channels from the multichannel source 410 into two portions. A first portion may be forwarded directly to the WSS 430 and a second portion may be forwarded via a variable optical amplifier (VOA) to the WSS 430. The VOA may attenuate the wavelength channels differently, e.g., introduce different losses to the wavelength channels, according to a determined spectrum profile. The two portions may then be combined at the WSS 430 to extend or increase the attenuation dynamic range of the WSS 430. In another setup, the multichannel source 410 may be coupled directly to the WSS 430, without using the splitter 420, if the WSS 430 has sufficient dynamic attenuation range. The WSS 430 may be configured to select some of the wavelength channels, e.g., a subset of channels from the range of wavelengths, that may determine the channel loading. Specifically, the WSS 430 may transmit the selected wavelength channels at substantially higher power than the remaining non-selected wavelength channels. The selected wavelength channels are designated in FIG. 4 as signal channels. The remaining non-selected wavelength channels may be used as probe channels and may have larger than zero power.

The wavelength channels, including the selected signal channels and the probe channels, may be transmitted to the EDFA 440, which may amplify the wavelength channels and forward the wavelength channels to the OSA 450. The OSA 450 may be used to measure the partial-fill noise figure and gain of the wavelength channels that correspond to the selected channel loading of the wavelength channels. The total power of the probe channels transmitted from the WSS 430 may be negligible compared to the power of the transmitted signal channels to ensure that the probe channels do not affect the EDFA 440 operating conditions. However, the total power of the probe channels may be high enough at the output of the EDFA 440 to ensure that the noise figure and gain measurements at the OSA 450 are sufficiently accurate. The measurement apparatus 400 may be used to obtain the noise figure and/or gain measurements (as a function of wavelength) for a plurality of different channel loading conditions, e.g., for different sets of selected wavelength or signal channels.

Figure 5:
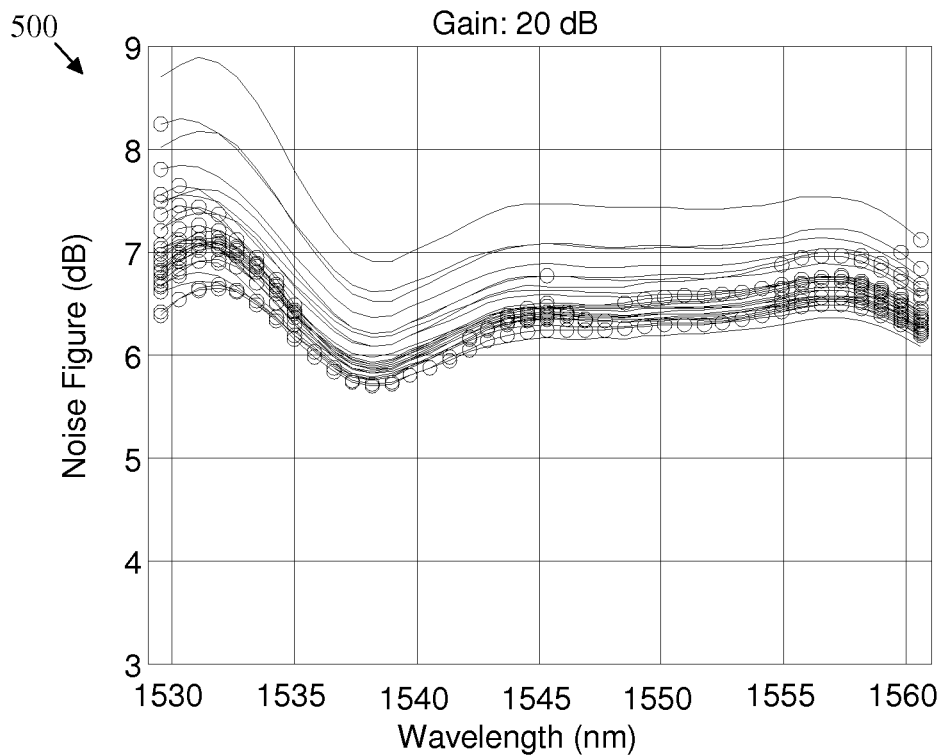
FIG. 5 is a chart of an embodiment of a partial-fill noise figure.

FIG. 5 illustrates an example of a partial-fill noise figure 500 that may be measured for the EDFA 440 using the measurement apparatus 400. FIG. 5 shows a plurality of curves for a plurality of different channel loading conditions, e.g., different sets of selected wavelength or signal channels. Specifically, the curves are measured at a EDFA gain of about 20 dB. The circles on the curves indicate the selected signal channels and the remaining data on the curves may correspond to the probe channels. Each curve represents a partial-fill noise figure (in dB) as a function of wavelength that extends from about 1,530 nm to about 1,560 nm. The curves indicate that the noise figure may be more dependent on the channel loading at shorter wavelengths, where higher variations or fluctuations in the noise figure value occur. For example, the variations at shorter wavelengths may reach about two dB.

Figure 6:
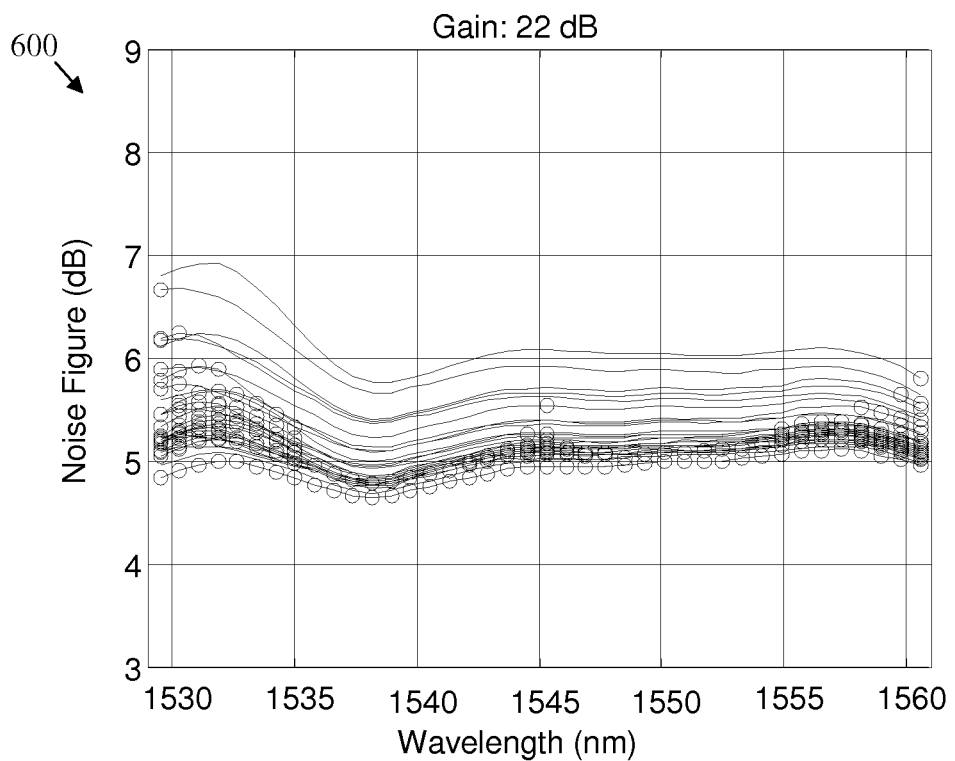
FIG. 6 is a chart of another embodiment of a partial-fill noise figure.

FIG. 6 illustrates an example of another partial-fill noise FIG. 600 that may be measured for the EDFA 440 using the measurement apparatus 400. FIG. 6 shows a plurality of curves for the same channel loading conditions in the partial-fill noise FIG. 500 and that correspond to an EDFA gain of about 22 dB. Similar to the partial-fill noise FIG. 500, the curves of the partial-fill noise FIG. 600 extend from about 1,530 nm to about 1,560 nm. The curves also indicate that the noise figure may be more dependent on the channel loading at shorter wavelengths. However, the variations in the values of the partial-fill noise FIG. 600 at the lower wavelengths are less than the variations in the values of the partial-fill noise FIG. 500.

Figure 7:
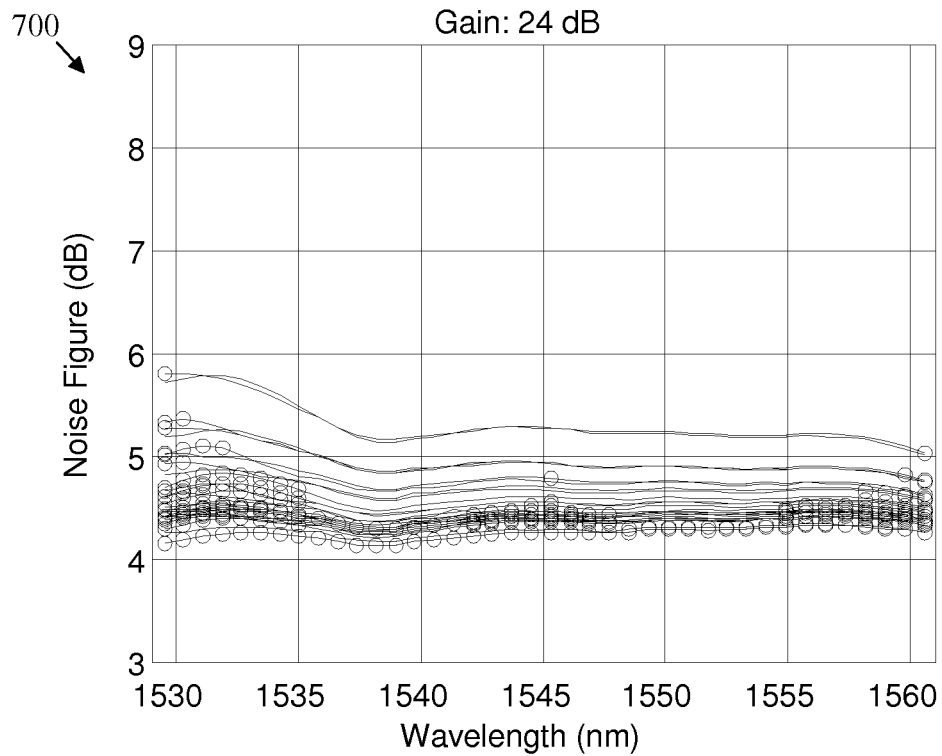
FIG. 7 is a chart of another embodiment of a partial-fill noise figure.

FIG. 7 illustrates an example of another partial-fill noise figure 700 that may be measured for the EDFA 440 using the noise figure and gain measurement apparatus 400. FIG. 7 shows a plurality of curves for the same channel loading conditions in the partial-fill noise figure 500 and that correspond to an EDFA gain of about 24 dB. The curves also indicate that the noise figure may be more dependent on the channel loading at shorter wavelengths, but the variations in the values are less than the variations in the values of the partial-fill noise figure 500 and the partial-fill noise figure 600.

Figure 8:
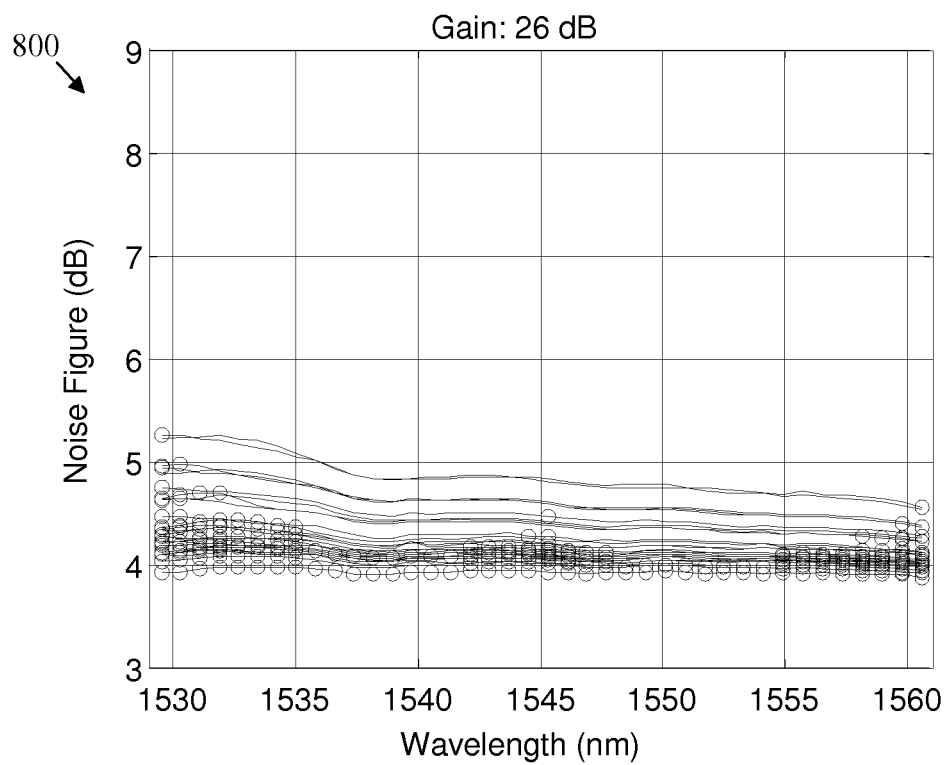
FIG. 8 is a chart of another embodiment of a partial-fill noise figure.

FIG. 8 illustrates an example of another partial-fill noise figure 800 that may be measured for the EDFA 440. FIG. 8 shows a plurality of curves for the same channel loading conditions in the partial-fill noise figure 500 and that correspond to an EDFA gain of about 26 dB. The curves also indicate that the noise figure may be more dependent on the channel loading at shorter wavelengths, but the variations in the values are less than the variations in the values of the partial-fill noise figure 700.

Figure 9:
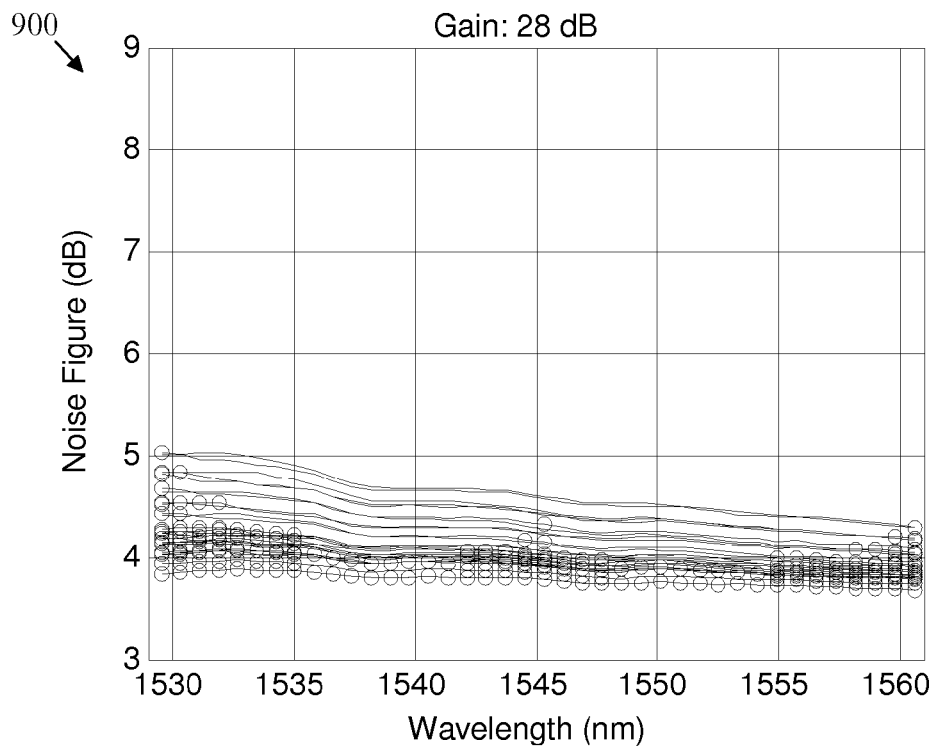
FIG. 9 is a chart of another embodiment of a partial-fill noise figure.
Figure 10:
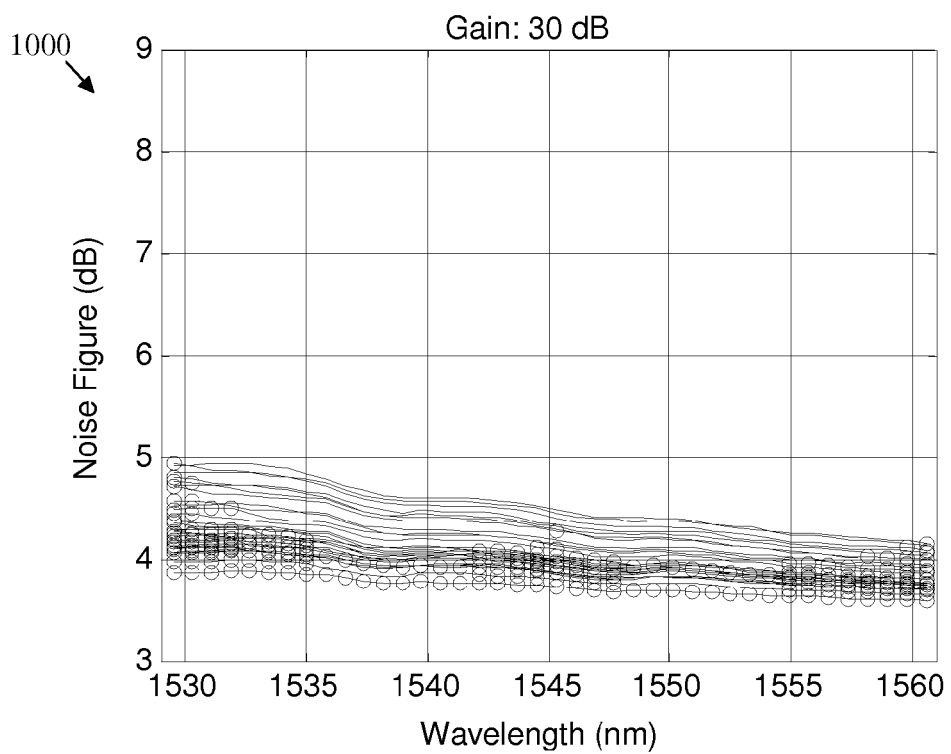
FIG. 10 is a chart of another embodiment of a partial-fill noise figure.

FIGS. 9 and 10 also illustrate examples of a partial-fill noise FIG. 900 and a partial-fill noise FIG. 1000, respectively, that may be measured for the EDFA 440. FIGS. 9 and 10 show a plurality of curves for the same channel loading conditions in the partial-fill noise FIG. 500 and that correspond to a gain of about 28 dB and about 30 dB, respectively. The curves indicate less dependency of the noise figure on the channel loading at shorter wavelengths in comparison to the partial-fill noise FIG. 700. Thus, the partial-fill noise FIGS. 500, 600, 700, 800, 900, and 1000 reveal a pattern of dependency of noise figure on channel loading at shorter wavelengths and a decrease in that dependency at higher gains.

Figure 11:
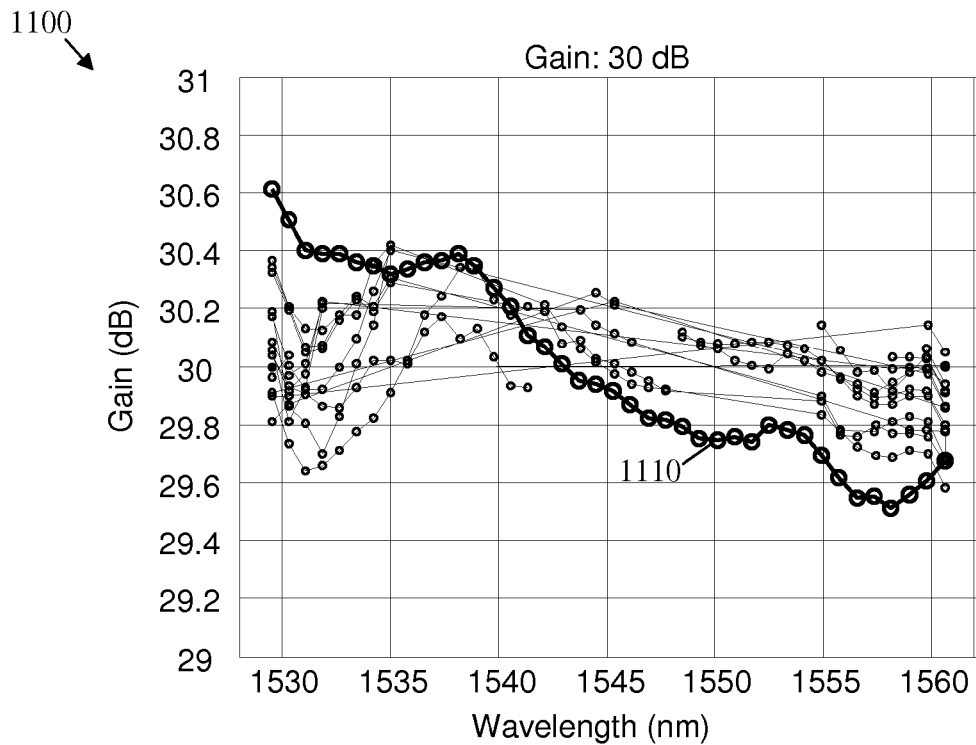
FIG. 11 is a chart of an embodiment of a partial-fill gain ripple.

FIG. 11 illustrates an example of a partial-fill gain ripple 1100 that may be measured for the EDFA 440 using the measurement apparatus 400. FIG. 11 shows a plurality of curves for similar channel loading conditions in the partial-fill noise figure 500. Specifically, the curves are measured for an EDFA gain of about 30 dB and a gain tilt of about −1 dB. FIG. 11 also shows a full-fill gain curve 1110, for a similar gain tilt of about −1 dB. The full-fill gain curve is measured based on a full-fill condition using the entire set of wavelength channels in the range from about 1,530 nm to about 1,560 nm. FIG. 11 reveals a substantial difference between the measured curves for the partial-fill case that accounts for selected channel loading and the full-fill gain curve 1110 that is based on all the available wavelength channels.

Figure 12:
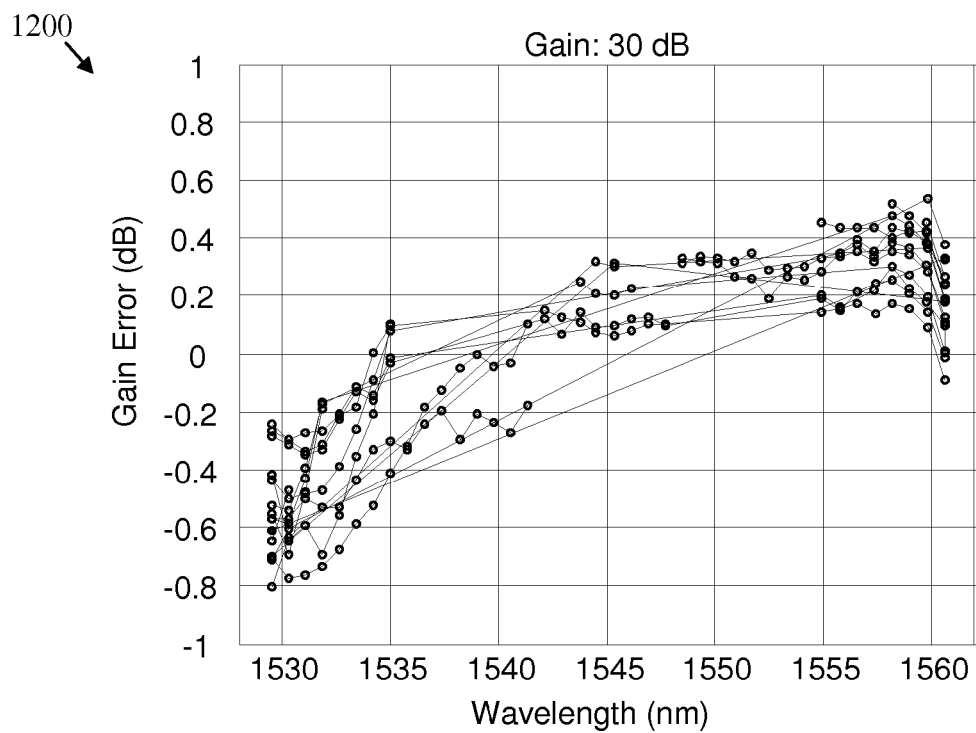
FIG. 12 is a chart of another embodiment of full-fill gain error.

FIG. 12 illustrates an example of partial-fill gain error 1200 with respect to the full-fill conditions. FIG. 11 shows a plurality of gain curves for the same channel loading conditions of the partial-fill gain ripple 1100. Specifically, the error curves represent the differences between the corresponding partial-fill gain curves and the full-fill gain curve 1110. The error curves reveal substantial errors between the measured partial-fill gain values and the full-fill gain values. For example, the gain error may be up to about 0.8 dB. Since, the gain error may be cumulative in a cascaded EDFA setup, such as the cascaded EDFAs 130 on the optical link, the total or cumulative gain error between the partial-fill and full-fill conditions may become substantially large.

The relationship between the noise figure and the channel loading may be complicated, e.g., due to the relatively large number of different possible combinations of wavelength channels for channel loading. Thus, obtaining an accurate partial-fill model that considers the various possible channel loading conditions may be difficult. However, a relationship between the noise figure and the quantity of wavelength channels that are used for channel loading may be obtained. Specifically, a larger noise figure difference or error between the partial-fill case and the full-fill case may be observed as fewer wavelength channels are selected for channel loading, as described below.

Figure 13:
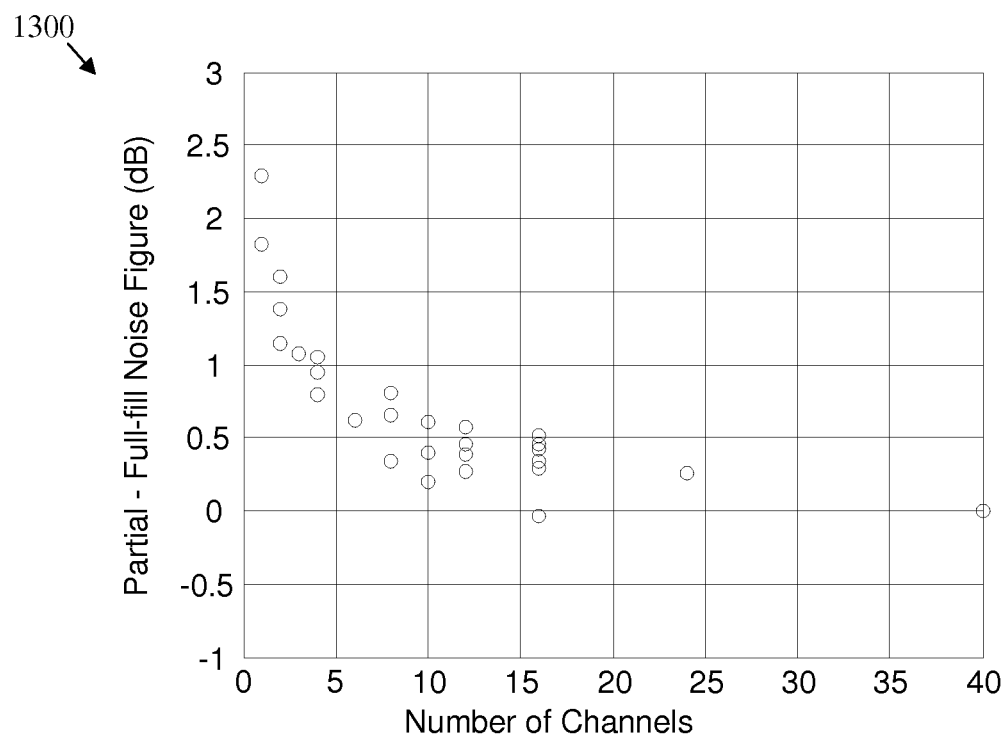
FIG. 13 is a chart of an embodiment of a noise figure difference.

FIG. 13 illustrates an example of a noise figure difference 1300 that may be calculated for multiple channel loading conditions with different number of selected wavelength channels. FIG. 13 shows the difference in values between each of a plurality of partial-fill gain figure curves for different numbers of selected wavelength channels and a full-fill gain figure curve for all the available wavelength channels. The partial-fill gain figure curves correspond to a range of channel conditions from about one selected wavelength channel to about 40 selected wavelength channels. The full-fill noise figure curve corresponds to using all the about 40 wavelength channels. Specifically, the difference values for each channel loading condition are calculated for the same wavelength signal about 1,529.55 nm, e.g., at the lower wavelength range. Accordingly, all the considered channel loading conditions comprise a selected wavelength channel at about 1,529.55 nm. The difference values vs. the number of wavelength channels are represented by circles. The circles that correspond to the same number of wavelength channels (e.g., are aligned on the x-axis) may not correspond to the same set of selected wavelength channels and may not have equal difference values (e.g., are not aligned on the y-axis). The values reveal an increase in the full-fill and partial-fill noise figure difference or error as the quantity of used wavelength channels decreases. When all the about 40 wavelength channels are used, the partial-fill noise figure may match the full-fill noise figure and thus the difference value may be equal to about zero.

Figure 14:
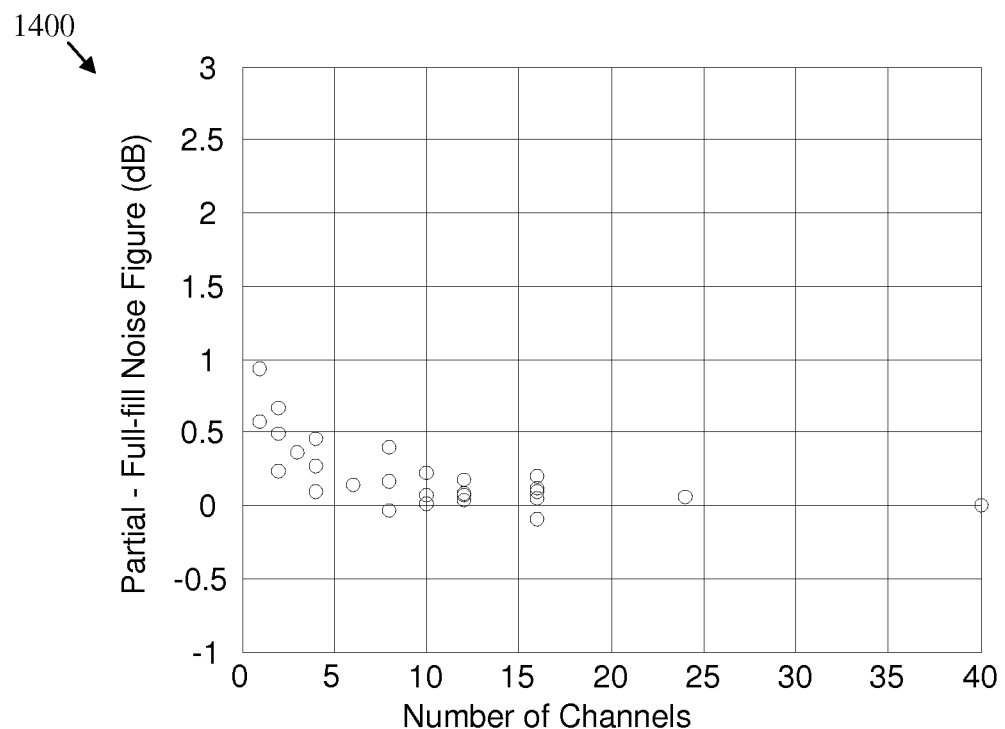
FIG. 14 is a chart of another embodiment of a noise figure difference.

Another observation may be made about the noise figure and the selected wavelength channels for channel loading. Specifically, a larger noise figure difference or error between the partial-fill case and the full-fill case may occur as fewer wavelength channels are selected for channel loading. FIG. 14 illustrates an example of another full-fill and partial-fill noise figure difference 1400 that may be calculated for multiple channel loading conditions with different number of wavelength channels. FIG. 14 shows the difference in values between each of a plurality of partial-fill noise figure curves for different number of selected wavelength channels and a full-fill noise figure curve. The partial-fill noise figure curves and the full-fill noise figure curve correspond to the same sets of selected wavelength channels of the noise figure difference 1300. However, in the noise figure difference 1400, the difference values for each channel loading condition are calculated for a wavelength signal at about 1,560.61 nm, e.g., at the higher wavelength range. As in the case of the noise figure difference 1300, the values of the noise figure difference 1400 reveal an increase in the full-fill and partial-fill noise figure difference or error as the quantity of used wavelength channels decreases. Since a similar pattern of increased noise figure difference with decreased number of wavelength channels was observed for the both the lower wavelength range and the higher wavelength range, this relationship between noise figure difference and quantity of selected wavelength channels may be independent of signal wavelength.

Figure 15:
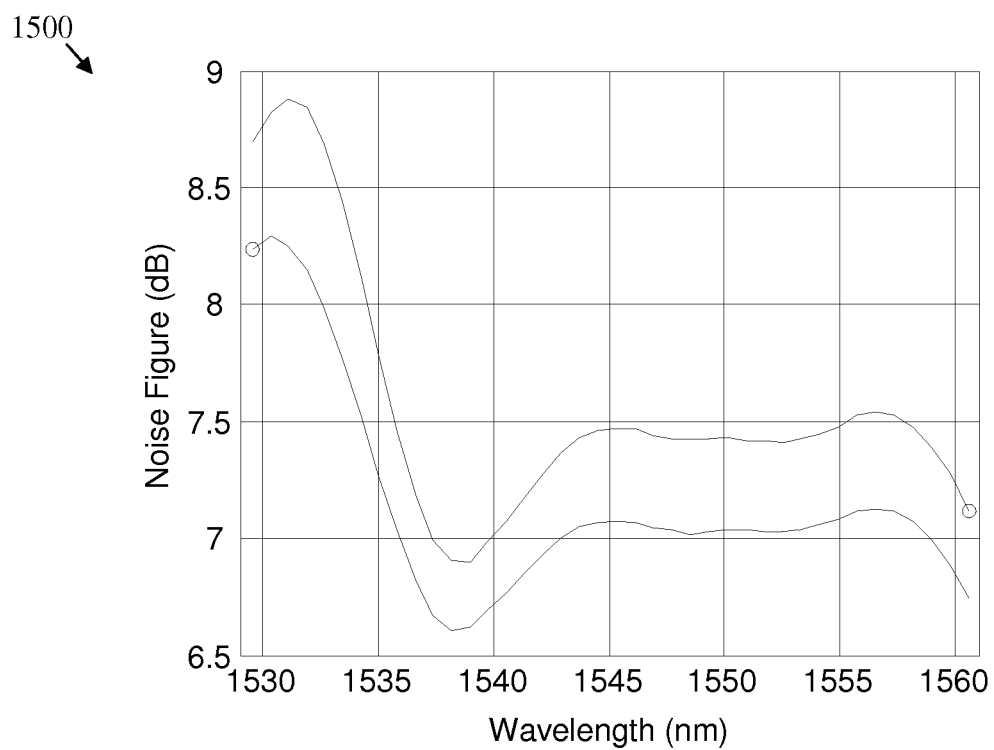
FIG. 15 is a chart of another embodiment of a partial-fill noise figure.

FIG. 15 illustrates an example of another partial-fill noise figure 1500. The partial-fill noise figure 1500 corresponds to using a single wavelength channel for channel loading. Two curves are shown for two cases of individually selected wavelength channels at about 1,530 nm and about 1,560 nm. The measured values of the partial-fill noise figure 1500 are shown for a plurality of wavelengths in the range from about 1,530 nm to about 1,560 nm. The circles on the curves indicate the selected signal channels and the remaining data on the curves may correspond to the probe channels. FIG. 15 shows that the curve that corresponds to the higher selected wavelength has higher noise values.

Figure 16:
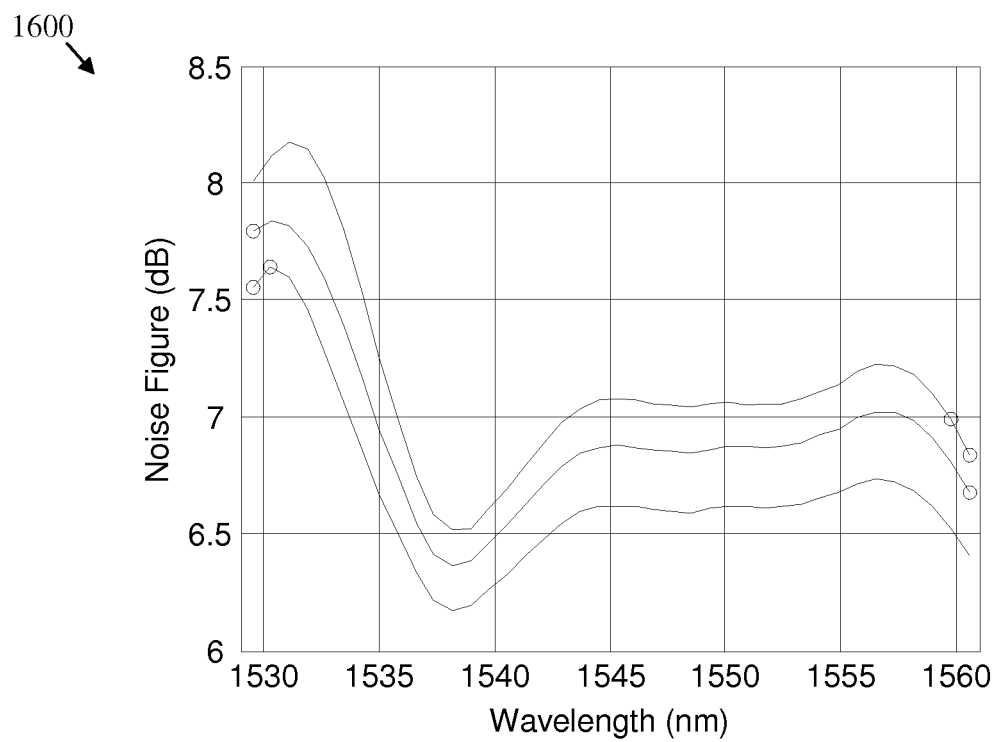
FIG. 16 is a chart of another embodiment of a partial-fill noise figure.

FIG. 16 illustrates an example of another partial-fill noise figure 1600. The two signal channels partial-fill noise figure 1600 corresponds to using two wavelength channels for channel loading. Three curves are shown for three cases of two selected wavelength channels. The measured values of the partial-fill noise figure 1600 are shown for a plurality of wavelengths in the range from about 1,530 nm to about 1,560 nm. The circles on the curves indicate the selected signal channels and the remaining data on the curves may correspond to the probe channels. As observed in FIG. 5, FIG. 16 also shows that the curves that correspond to higher selected wavelengths have higher noise values.

FIGS. 15 and 16 reveal that using a smaller wavelength for channel loading may further reduce the noise figure value in comparison to using a larger wavelength. For instance, selecting a set of smaller wavelength channels may result in a smaller noise figure than selecting a set of larger wavelength channels with the same number of wavelengths. An effective channel number or effective number of channels may be defined to account for the relative contribution in reducing the noise figure at different wavelengths, as follows:

$$n_{\mathit{eff}}(\lambda)=c_1(\lambda_{\mathit{ref}}-\lambda)+c_0. \quad (1)$$

In equation (1) above, $\lambda_{\mathit{ref}}$ is a reference wavelength and $c_0$ and $c_1$ are constants that may be empirically determined. The effective number of channels may not correspond or match the actual number of channels used for channel loading.

Figure 17:
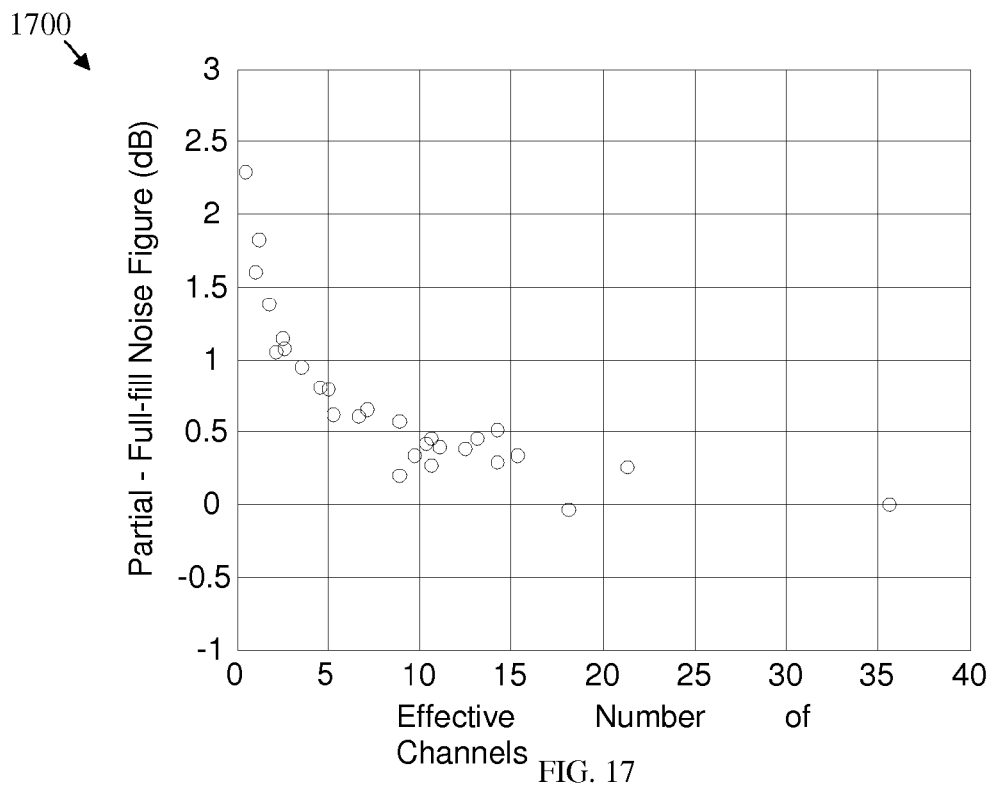
FIG. 17 is a chart of an embodiment of a noise figure difference.

FIG. 17 illustrates an example of another noise figure difference 1700. The noise figure difference 1700 is obtained by plotting the values of the noise figure difference 1300 vs. a sequence of calculated effective number of channels according to equation (1). The effective number of channels, or $n_{\mathit{eff}}$, is a function of the wavelength channel, and ranges in value from about one to about 36 (on the x-axis). The $n_{\mathit{eff}}$ values are calculated using a $\lambda_{\mathit{ref}}$ of about 1,529.55 nm, which is the wavelength channel of the noise figure difference 1300, $c_1$ of about 0.026 nm, and $c_0$ of about 0.5. A comparison of the values in FIG. 17 and FIG. 13 reveals that the spread of difference values (on the y-axis) of the noise figure difference 1700 for the same effective number of channels is substantially reduced in comparison to the spread of difference values of the noise figure difference 1300 for the same actual number of channels.

Figure 18:
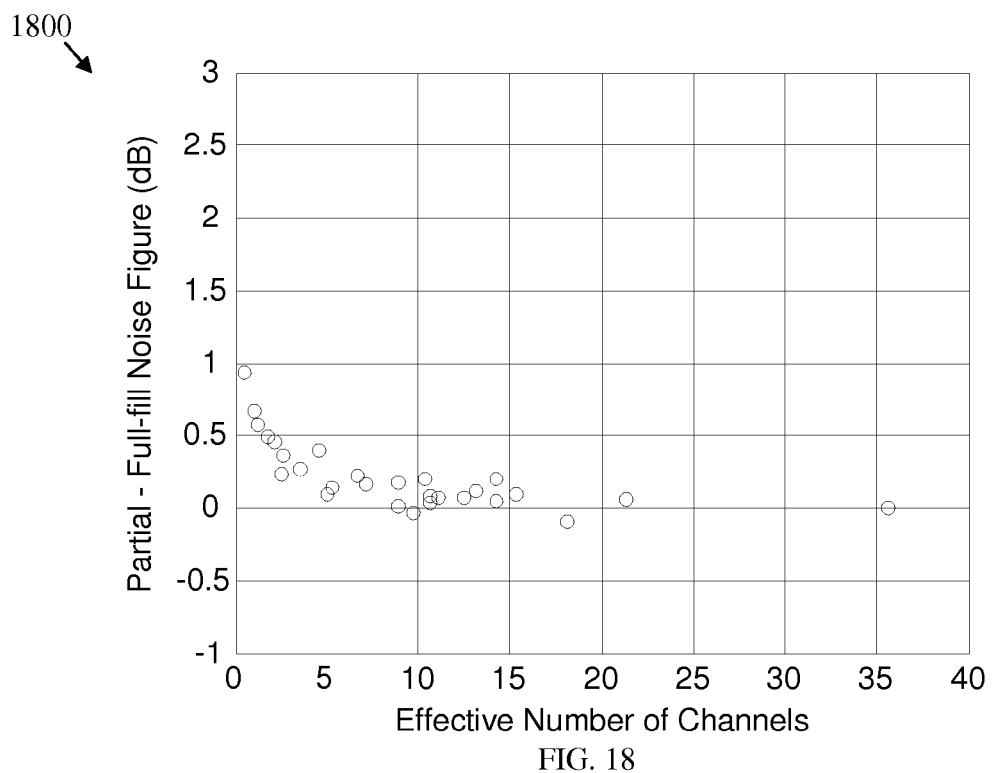
FIG. 18 is a chart of another embodiment of a noise figure difference.

FIG. 18 illustrates an example of another noise figure difference 1800, which is obtained by plotting the values of the full-fill and partial-fill noise figure difference 1400 vs. the same calculated effective number of channels of FIG. 17. The reference wavelength $\lambda_{ref}$ corresponds to about 1,560.61 nm, which is the wavelength channel of the noise figure difference 1400. A comparison of the values in FIG. 18 and FIG. 14 also reveals that the spread of noise difference values of the noise figure difference 1800 for the same effective number of channels is substantially reduced in comparison to the spread of noise difference values of the noise figure difference 1400 for the same actual number of channels.

To account for channel loading and substantially match a partial-fill condition, a noise figure correction to the full-fill noise figure may be calculated using the effective number of channels. For instance, the noise figure correction may be calculated based on equation (1), as follows:

$$\Delta NF_{dB} = \frac{p_1}{n_{\text{eff}} + p_3} \exp(-p_2 n_{\text{eff}}). \quad (2)$$

In equation (2) above, $p_1$, $p_2$, and $p_3$ are fitting constants that may be determined empirically.

Figure 19:
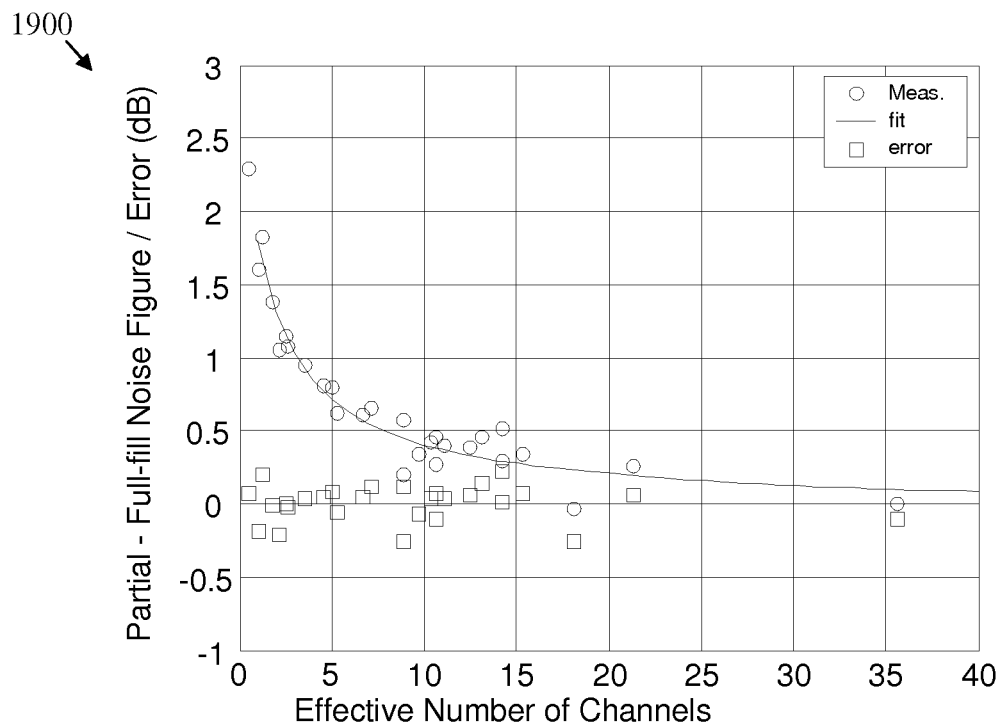
FIG. 19 is a chart of another embodiment of a noise figure difference.

FIG. 19 illustrates an example of another noise figure difference 1900 that includes the values of the noise figure difference 1700. The noise figure difference 1900 also includes a fit curve and a plurality of residual error values (as indicated in the legend). The fit curve is obtained using the noise figure correction model of equation (2) and corresponds to $\Delta NF_{dB}$ as a function of $n_{\text{eff}}$. The reference wavelength $\lambda_{ref}$ corresponds to about 1,529.55 nm, which is the wavelength channel of the noise figure difference 1700. The residual error values represent the difference between the fit curve values and the values of the noise figure difference 1900. The residual error values are substantially low, e.g., close to about zero, which indicates that the noise figure correction model of equation (2) may be used to correct the full-fill noise figure to match the partial-fill noise figure with sufficient accuracy.

Figure 20:
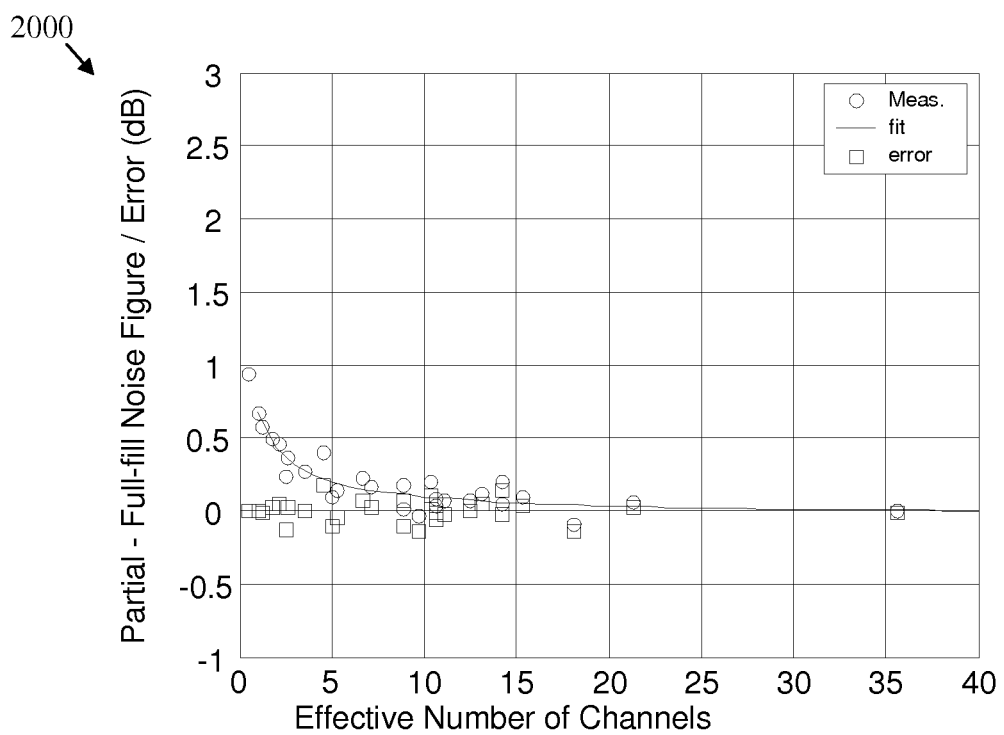
FIG. 20 is a chart of another embodiment of a noise figure difference.

FIG. 20 illustrates an example of another noise figure difference 2000 that includes the values of the noise figure difference 1800. The noise figure difference 2000 also includes a fit curve and a plurality of residual error values (as indicated in the legend). The fit curve is obtained using the noise figure correction model of equation (2) and corresponds to $\Delta NF_{dB}$ as a function of $n_{\text{eff}}$. The reference wavelength $\lambda_{ref}$ corresponds to about 1,560.61 nm, which is the wavelength channel of the noise figure difference 1800. The residual error values represent the difference between the fit curve values and the values of the noise figure difference 2000. As in the case of FIG. 19, the residual error values in FIG. 20 are substantially low, e.g., close to about zero, which also shows that the noise figure correction model of equation (2) may accurately correct the full-fill noise figure to match the partial-fill noise figure and account for channel loading.

FIGS. 19 and 20 illustrate using the noise figure correction of equation (2) based on the effective number of wavelength channels of equation (1) to adjust or correct the values of a full-fill noise figure in the case of channel loading, e.g., when selecting less than a full set of wavelength channels. Specifically, the noise figure values are corrected at about the wavelengths 1,529.55 nm and 1,560.61 nm. The other wavelengths in the range between about 1,529.55 nm and about 1,560.61 nm may be corrected using an interpolation method.

Further, since the gain errors in partial-fill scenarios may be substantially caused by a spectral hole burning effect, a gain correction may be modeled as follows:

$$\Delta G(\lambda) = -\alpha g(n) \sum_{i=1}^{n} \exp\left(-\frac{(\lambda - \lambda_i)}{w^2} - \frac{(\lambda_i - \lambda_{SHB})}{W^2}\right). \quad (3)$$

In equation (3) above, $\lambda$ is a wavelength, $\lambda_1$ is the selected wavelength channel, and $\alpha$, w, and W are constants that may be determined empirically. The function g(n) is a function of the number of channels and may account to the fact that as the number of channels increases, the hole depth decreases, where n indicates the actual number of wavelength channels for channel loading.

Figure 21:
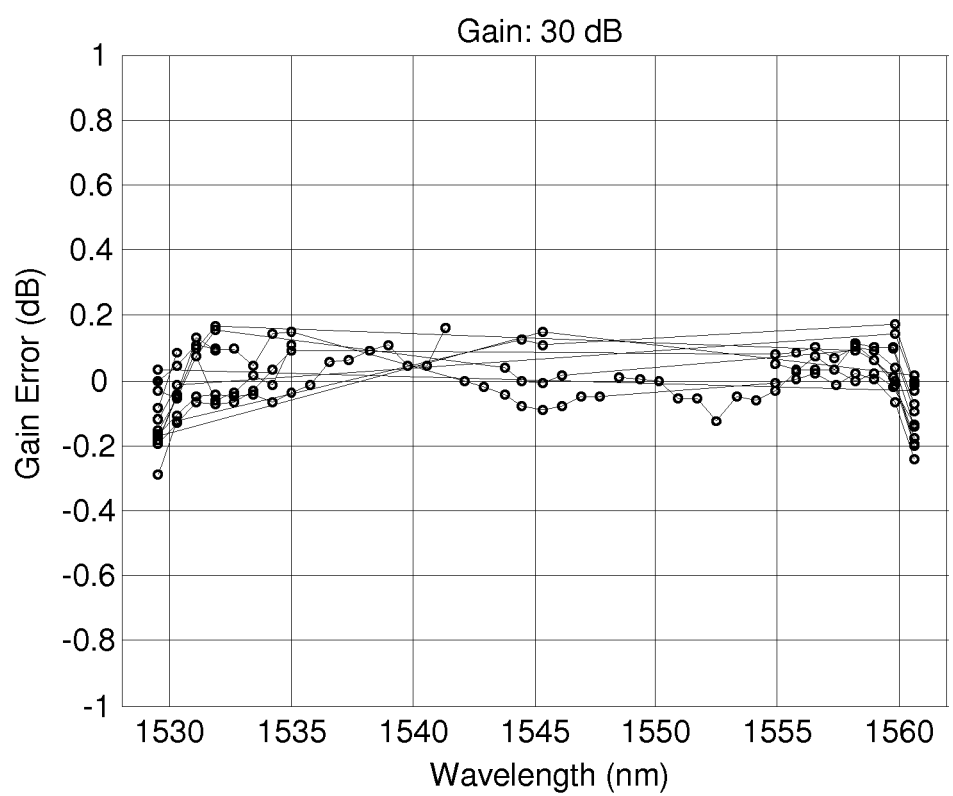
FIG. 21 is a chart of an embodiment of a gain correction.

FIG. 21 illustrates an example of a gain error after correction 2100 that may be obtained for a full-fill gain error, such as the full-fill gain error 1200. FIG. 21 shows a plurality of corrected or adjusted curves that correspond to the curves in FIG. 12. The curves are corrected using the gain correction model of equation (3) and corresponds to $\Delta G(\lambda)$ as a function of $\lambda$. Specifically, the following values were used in equation (3): $\alpha$=0.15 dB, $\lambda_{SHB}$=1,929 nm, w=2 nm, W=6 nm, and $$g(n) = \frac{n+25}{2n}.$$

The corrected curves reveal substantially reduced gain errors between the measured partial-fill case values and the full-fill case values in comparison to the error curves in FIG. 12. For example, the gain error may be up to about 0.2 dB in the gain error after correction 2100 instead of about 0.8 dB in the full-fill gain error 1200 without the gain correction model of equation (3).

Figure 22:
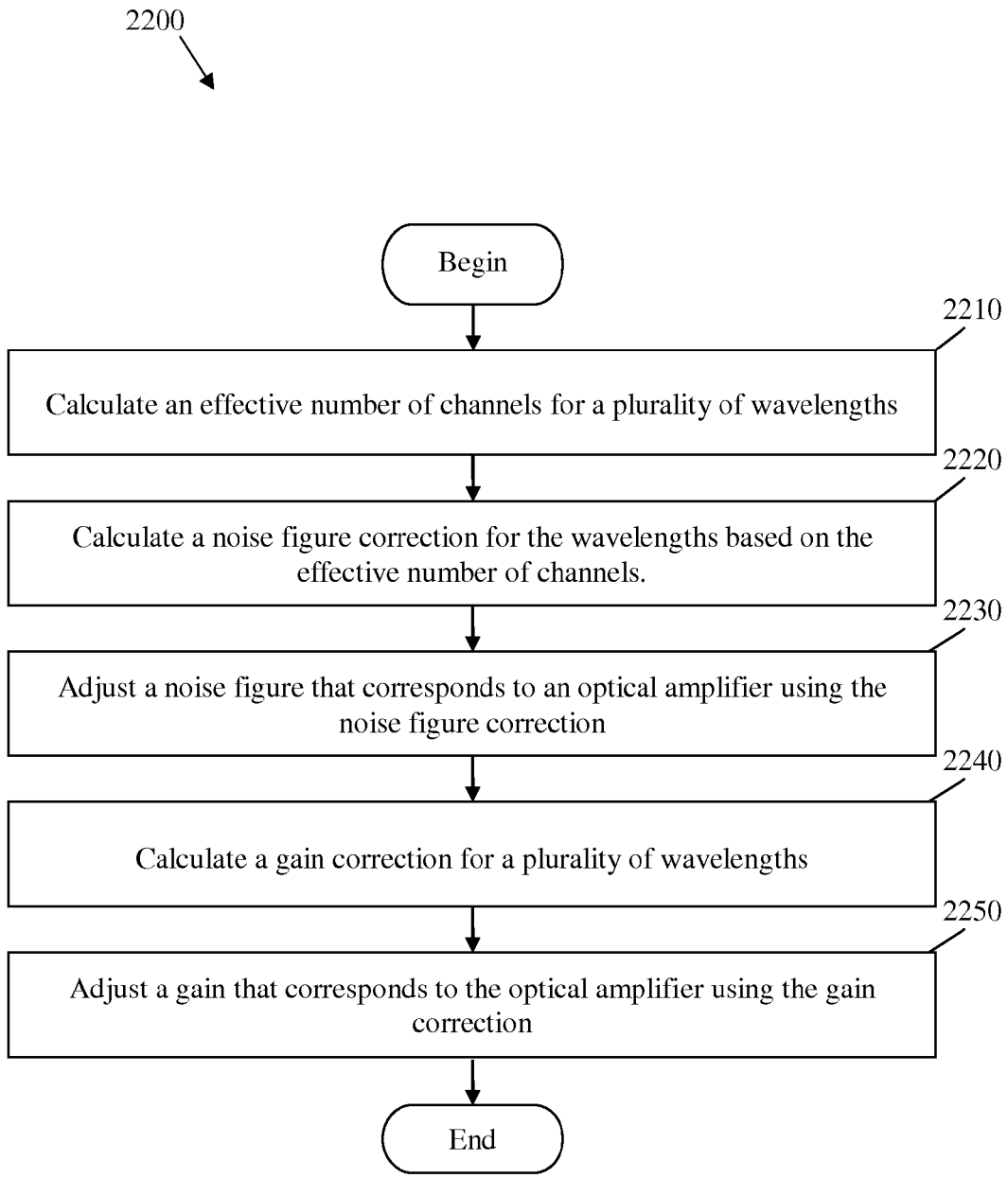
FIG. 22 is a flowchart of an embodiment of a partial filled noise figure and gain modeling method.

FIG. 22 illustrates an embodiment of a partial filled noise figure and gain modeling method 2200. The method 2200 may be implemented to design different communications networks or systems, such as the optical communications system 100, which uses one or more optical amplifiers, e.g., EDFAs, to account for the noise figure and/or gain variations caused by partial filled cases. Additionally or alternatively, the method 2200 may be used to control some of the components during operation, e.g., to adjust or control the channel loss (e.g. 120, 150 in FIG. 1) in order to equalize the channel OSNR.

The method 2200 may begin at block 2210, where an effective number of channels may be calculated for a plurality of wavelengths. The effective number of channels ($n_{\text{eff}}$) may be calculated using equation (1) for one or more wavelengths (e.g., $\lambda_{ref}$). The empirical parameters of equation (1) may be predetermined based on a plurality of simulations and/or measurements of different network and channel loading conditions. At block 2220, a noise figure correction may be calculated for the wavelengths based on the number of effective channels. The noise figure correction ($\Delta NF_{dB}$) may be calculated based on equation (2). The empirical parameters of equation (2) may also be predetermined based on prior simulations/measurements. The noise figure correction may be calculated for one or more wavelengths of interest. At block 2230, a noise figure that corresponds to an optical amplifier may be adjusted using the noise figure correction. For instance, the noise figure may be modeled based on a full-fill scenario or may be measured for a full-fill case for the optical amplifier in the network or system. The adjusted noise figure may then correspond to a partial-fill scenario for a channel loading condition that corresponds to the effective number of channels.

Additionally or alternatively, the method 2200 may implement blocks 2240 and 2250. At block 2240, a gain correction may be calculated for a plurality of wavelengths. The gain error correction ($\Delta G(\lambda)$) may be calculated for one or more wavelengths based on equation (3). At block 2250, a gain that corresponds to the optical amplifier may be adjusted using the gain error correction. The gain may be modeled based on a full-fill scenario or may be measured for a full-fill case for the optical amplifier in the network or system. The adjusted gain may then correspond to a partial-fill scenario for the channel loading condition that corresponds to the number of selected wavelength channels. The method 2200 may then end.

In the method 2200, the adjusted noise figure and/or the adjusted gain may be obtained for different optical amplifier gains, e.g., at about 20 dB, about 30 dB, or other values. The adjusted noise figure/gain may then be used as design parameters for at least some of the components or as control parameters to operate some of the components in an optical communications system or network. For instance, the adjusted noise figure/gain may be used to estimate and/or control an OSNR for an optical link, the power ripple on the optical link, dynamic range requirement of a channel actuator for OSNR equalization, or combinations thereof. The method 2200 may be implemented using hardware, software, or both (e.g., using a processor) and may be used as part of a design method or control method for the systems/networks. For instance, the method 2200 may be implemented using hardware and/or software on a computer as part of a network design method or on a network component as part of a network control method.

Figure 23:
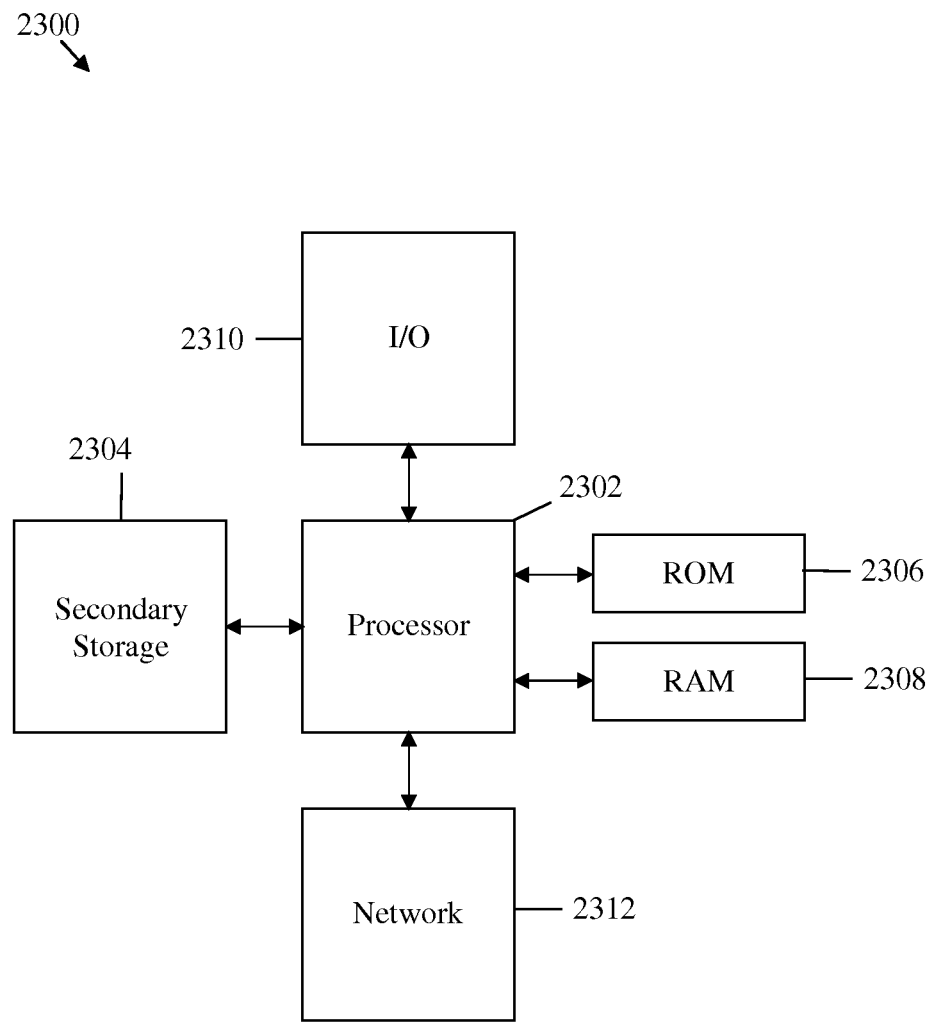
FIG. 23 is a schematic diagram of an embodiment of a general-purpose computer system.

The network components and/or methods described above may be implemented on any general-purpose network component, such as a computer or network component with sufficient processing power, memory resources, and network throughput capability to handle the necessary workload placed upon it. FIG. 23 illustrates a typical, general-purpose network component 2300 suitable for implementing one or more embodiments of the components disclosed herein. The network component 2300 includes a processor 2302 (which may be referred to as a central processor unit or CPU) that is in communication with memory devices including second storage 2304, read only memory (ROM) 2306, random access memory (RAM) 2308, input/output (I/O) devices 2310, and network connectivity devices 2312. The processor 2302 may be implemented as one or more CPU chips, or may be part of one or more application specific integrated circuits (ASICs).

The second storage 2304 is typically comprised of one or more disk drives or tape drives and is used for non-volatile storage of data and as an over-flow data storage device if RAM 2308 is not large enough to hold all working data. Second storage 2304 may be used to store programs that are loaded into RAM 2308 when such programs are selected for execution. The ROM 2306 is used to store instructions and perhaps data that are read during program execution. ROM 2306 is a non-volatile memory device that typically has a small memory capacity relative to the larger memory capacity of second storage 2304. The RAM 2308 is used to store volatile data and perhaps to store instructions. Access to both ROM 2306 and RAM 2308 is typically faster than to second storage 2304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:
1. An apparatus comprising:
a processor configured to calculate a noise figure of an optical amplifier for a plurality of selected wavelength channels, wherein the noise figure is calculated using a plurality of corresponding noise figure correction values at a plurality of wavelengths, wherein the noise figure correction values are based on an effective number of channels, but are not based on power, and wherein the effective number of channels accounts for a plurality of different actual numbers of the selected wavelength channels for different channel loading scenarios; and a memory coupled to the processor and configured to store the noise figure.

2. The apparatus of claim 1, wherein the optical amplifier is an Erbium Doped Fiber Amplifier (EDFA) that is positioned on an optical link.

3. The apparatus of claim 1, wherein the noise figure is calculated for the wavelengths at one or more gain levels of the optical amplifier, and wherein the noise figure is more sensitive to at least one of smaller wavelengths and lower gain levels.

4. The apparatus of claim 1, wherein the noise figure correction values represent a plurality of differences between the noise figure that accounts for channel loading and a corresponding second noise figure that does not account for channel loading.

5. The apparatus of claim 4, wherein a spread of the plurality of differences decreases as the effective number of channels for a same actual number of selected wavelength channels, and wherein the same actual number of selected wavelength channels may not correspond to a same set of selected wavelength channels.

6. The apparatus of claim 4, wherein the noise figure is reduced across the wavelengths when fewer wavelength channels are selected for channel loading, and wherein the differences are also reduced across the wavelengths when fewer wavelength channels are selected for channel loading.

7. The apparatus of claim 1, wherein the processor is further configured to calculate a gain correction of the optical amplifier for the selected wavelength channels, and wherein the gain correction is calculated for the plurality of wavelengths based on an actual number of the selected wavelength channels that correspond to a channel loading scenario.

8. The apparatus of claim 7, wherein the gain correction, the noise figure, or both are used to design one or more components that interact with the optical amplifier in an optical communications system.

9. The apparatus of claim 7, wherein the gain correction, the noise figure, or both are used to estimate an optical signal to noise ratio (OSNR) for an optical link, a power ripple on the optical link, a dynamic range requirement of a channel actuator for OSNR equalization, or combinations thereof.

10. A computer implemented method comprising:
calculating with a processor an effective number of channels for a plurality of wavelengths, wherein the effective number of channels accounts for a relative contribution in reducing a noise figure at different wavelengths and is calculated based on a reference wavelength, but not based on power;
calculating with the processor a noise figure correction for the wavelengths based on the effective number of channels; and
adjusting with the processor a noise figure that corresponds to all optical amplifier using the noise figure correction.

11. The computer implemented method of claim 10, wherein the effective number of channels is calculated as follows:

$$n_{eff}(\lambda) = c_1(\lambda_{ref} - \lambda) + c_0,$$

wherein $\lambda_{ref}$ is a reference wavelength, $\lambda$ is a wavelength, and $c_0$ and $c_1$ are empirical constants, wherein the noise figure is calculated as follows:

$$\Delta NF_{dB} = \frac{p_1}{n_{eff} + p_3} \exp(-p_2 n_{eff}),$$

and wherein $p_1$, $p_2$, and $p_3$ are fitting constants.

12. The computer implemented method of claim 10, further comprising:
calculating a gain correction for the plurality of wavelengths; and
adjusting a gain that corresponds to the optical amplifier using the gain correction.

13. The computer implemented method of claim 12, wherein the gain correction is calculated as follows:

$$\Delta G(\lambda) = -\alpha g(n) \sum_{i=1}^{n} \exp\left(-\frac{(\lambda - \lambda_i)}{w^2} - \frac{(\lambda_i - \lambda_{SHB})}{W^2}\right),$$

wherein $\lambda$ is a wavelength, $\lambda_i$ is a selected wavelength channel, and $\lambda_{SHB}$ is a spectral hole burning wavelength, wherein $\alpha$, w, and W if are empirical constants, and wherein g(n) is a function of a number of channels (n) that accounts for the fact that as the number of channels increases, a spectral hole depth decreases.

14. The computer implemented method of claim 10, wherein the optical amplifier is an Erbium Doped Fiber Amplifier (EDFA) that is positioned on an optical link.

15. A method comprising:
monitoring an optical-to-signal noise ratio (OSNR) of an optical amplifier positioned on an optical link;
calculating a gain correction of the optical amplifier for a plurality of selected wavelength channels, wherein the gain correction is based on a selected wavelength channel, but is not based on power; and
forwarding the gain correction to a channel actuator coupled to the optical amplifier for OSNR equalization.

16. The method of claim 15, wherein the gain correction is calculated as follows:

$$\Delta G(\lambda) = -\alpha g(n) \sum_{i=1}^{n} \exp\left(-\frac{(\lambda - \lambda_i)}{w^2} - \frac{(\lambda_i - \lambda_{SHB})}{W^2}\right),$$

wherein $\lambda$ is a wavelength, $\lambda_i$ is the selected wavelength channel, and $\lambda_{SHB}$ is a spectral hole burning wavelength, wherein $\alpha$, w, and W are empirical constants, and wherein a function g(n) is a function of a number of channels (n) that accounts for the fact that as the number of channels increases, a spectral hole depth decreases.

17. The method of claim 15, further comprising:
calculating a noise figure of the optical amplifier for the selected wavelength channels in a partial-fill scenario (partial-fill noise figure) that accounts for channel loading, wherein the noise figure is calculated using a plurality of corresponding noise figure correction values at a plurality of wavelengths based on an effective number of channels; and
forwarding the calculated partial-fill noise figure to the channel actuator coupled to the optical amplifier for OSNR equalization.

18. The method of claim 17, wherein the partial-fill noise figure is calculated for the selected wavelength channels at one or more gain levels of the optical amplifier, and wherein the partial-noise noise figure is more sensitive to at least one of smaller wavelengths and lower gain levels.

19. The method of claim 15, wherein the optical amplifier is an Erbium Doped Fiber Amplifier EDFA), and wherein the optical link comprises at least one optical filter.

20. A method comprising:
   identifying, using a processor, a full-fill scenario that implements a first number of wavelengths;
   identifying, using the processor, a partial-fill scenario that implements a second number of wavelengths that is less than the first number of wavelengths;
   calculating, using the processor, a noise figure correction associated with the partial-fill scenario;
   calculating, using the processor, a noise figure associated with the full-fill scenario; and
   adjusting, using the processor, the noise figure using the noise figure correction.

21. The method of claim of claim 20, wherein the noise figure correction is calculated using an effective channel number that accounts for a relative contribution in reducing the noise figure at different wavelengths.

22. The method of claim 20, further comprising:
   calculating, using the processor, a gain correction associated with the partial-fill scenario;
   calculating, using the processor, a gain associated with the full-fill scenario; and
   adjusting, using the processor, the gain using the gain correction.

* * * * *

UNITED STATES PATENT AND TRADEMARK OFFICE
CERTIFICATE OF CORRECTION

PATENT NO. : 9,059,799 B2  Page 1 of 1
APPLICATION NO. : 13/091690
DATED : June 16, 2015
INVENTOR(S) : Zhiping Jiang et al.

It is certified that error appears in the above-identified patent and that said Letters Patent is hereby corrected as shown below:

In The Claims

Column 15, Line 7, Claim 19 should read:

The method of claim 15, wherein the optical amplifier is an Erbium Doped Fiber Amplifier (EDFA), and wherein the optical link comprises at least one optical filter.

Signed and Sealed this
Ninth Day of February, 2016

Michelle K. Lee
*Director of the United States Patent and Trademark Office*